US006280830B1

(12) United States Patent
Nakanishi et al.

(10) Patent No.: US 6,280,830 B1
(45) Date of Patent: Aug. 28, 2001

(54) ELECTROPHOTOGRAPHIC TRANSFER PAPER

(75) Inventors: Ryosuke Nakanishi; Kiyoshi Hosoi, both of Ebina; Tomofumi Tokiyoshi; Masaru Kato, both of Kotou-ku, all of (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/207,330

(22) Filed: Dec. 7, 1998

(30) Foreign Application Priority Data

Dec. 9, 1997 (JP) .................................................. 9-338584

(51) Int. Cl.[7] ............................. B32B 29/00; B32B 3/00; B32B 7/00

(52) U.S. Cl. ......................... 428/211; 428/212; 428/218; 428/219; 428/341; 428/914

(58) Field of Search .................................... 428/211, 212, 428/218, 219, 332, 537.5

(56) References Cited

U.S. PATENT DOCUMENTS 5,637,383 * 6/1997 Sakurai et al. ....................... 428/211
5,885,698 * 3/1999 Takehana et al. ................... 428/212
5,925,446 * 7/1999 Matsuda et al. ...................... 428/219

FOREIGN PATENT DOCUMENTS

A-62-198875 9/1987 (JP) .
A-8-171226 7/1996 (JP) .

* cited by examiner

*Primary Examiner*—Bruce H. Hess
*Assistant Examiner*—B. Shewareged
(74) *Attorney, Agent, or Firm*—Oliff & Berridge, PLC

(57) ABSTRACT

An electrophotographic transfer paper comprising a substrate and coating layers formed on both sides of the substrate mainly including a pigment and an adhesive, wherein the paper has a glossiness of not less than 55% (corresponding to 75 degree white paper glossiness in accordance with JIS P-8142) and satisfies the following condition when the paper packed in a package is unpacked and allowed to stand at a temperature of 28° C. in an atmosphere of 85%RH for 5 minutes:

$$0.8 \leqq CA/D \leqq 3.5$$

wherein CA ($\mu$m) is the difference calculated by subtracting a thickness of paper before allowed to stand from a thickness of paper after allowed to stand and D (g/cm$^3$) is the density of the transfer paper (JIS P-8118).

6 Claims, No Drawings

ELECTROPHOTOGRAPHIC TRANSFER PAPER

BACKGROUND OF THE INVENTION

1. Field of the Invention

The present invention relates to an electrophotographic transfer paper for use in a dry indirect electrophotographic full-color or monochromatic duplicating machine, printer, etc. which exhibits a high paper gloss and excellent running properties, particularly in a high humidity and temperature atmosphere.

2. Description of the Related Art

In recent years, the trend of more duplicating machines and printers is to be provided in a multi-color system, operate at a higher speed and provide a higher image quality. Also, in the art of on-demand publications, color duplicating machines or printers have been made able to meet the demand for easier publication of copies in a smaller circulation. Thus, there has been a marked trend toward the use of duplicating machines or printers in publishing this kind of printed matters.

A coated paper having a high white paper glossiness commonly known as a glossy coated paper is normally obtained by applying a particulate pigment having an average particle diameter of not more than 2 $\mu$m to a substrate in an amount of not less F than 10 g/m$^2$ for each side by means of any of various coaters, and then calendering the coated material to smooth the surface thereof. Such a coated paper having the high white paper glossiness has been normally used in the art of commercial printing. Also in duplicating machines and printers, the foregoing coated paper has been used more occasionally instead of conventional PC papers or printer papers to obtain an image which is sharper than ever.

In the operation of the duplicating machines or the printers, a stack of papers is placed on a tray disposed inside the main body thereof or a manual tray disposed outside the main body, and then fed into the printing zone one sheet by one sheet. However, when fed in a high humidity atmosphere as in rainy season, the printing coated paper having the high white paper glossiness can be subject to so-called misfeeding, that is, two sheets of the coated paper can be stuck to each other and thus cannot be fed. This is because the coefficient of friction between the printing coated papers in stack becomes very large in the high humidity atmosphere. Such a coated paper normally has a higher smoothness than other coated papers for use in duplicating machines or printers. Because of the presence of a coating layer, such a coated paper also has a low water absorptivity. Therefore, it is thought that the water content attached to a surface of the coating layer is not easily absorbed by the coating layer but adsorbed by a surface of the coated paper in the high humidity atmosphere. The smoother the coating layer is, the more easily this excessive adsorbed water on the surface of one coated paper can adhere to the surface of another. This is probably because the surface tension and hydrogen bond of the adsorbed water cause the papers to be stuck to each other, raising the coefficient of static friction therebetween and hence preventing the paper from running.

As a method for improving the running properties of coated paper there is proposed a method disclosed in JP-A-62-198875 involving an adjustment of the surface roughness of coated layer and the standard deviation of the coefficient of static friction between papers to not more than 2.0 $\mu$m and not more than 0.05, respectively (The term “JP-A” as used herein means an “unexamined published Japanese patent application”). However, this proposal has no recognition that water present between papers causes a poor running and the poor running is also due to the surface tension of water. Further, a method disclosed in JP-A-8-171226 which eliminates the poor running in the high humidity atmosphere by adjusting the smoothness and the air permeability of coated paper measured by Oken type testers to a range of from 60 to 300 seconds and a range of from 10 to 90 seconds, respectively, has been proposed. Regrettably, under these conditions, a coated paper having a white paper glossiness of not less than 55% cannot be produced.

SUMMARY OF THE INVENTION

In view of the foregoing, it is an object of the present invention to solve the foregoing problems and provide an electrophotographic transfer paper to improve the running properties in a high humidity atmosphere over the related art coated paper having a high white paper gloss and a high smoothness.

The inventors made extensive studies to solve the foregoing problems with a coated paper having the high white paper gloss and the high smoothness. As a result, it was found that the use of the following constitutions makes it possible to solve the problems:

(1) An electrophotographic transfer paper comprising a substrate and coating layers formed on both sides of the substrate mainly including a pigment and an adhesive, wherein the paper has a glossiness of not less than 55% (corresponding to 75 degree white paper glossiness in accordance with JIS P-8142) and satisfies the following condition when the paper packed in a package is unpacked and allowed to stand at a temperature of 28° C. in an atmosphere of 85%RH for 5 minutes:

$$0.8 \leqq CA/D \leqq 3.5$$

wherein CA ($\mu$m) is the difference calculated by subtracting a thickness of paper before allowed to stand from a thickness of paper after allowed to stand and D (g/cm$^3$) is the density of the transfer paper (JIS P-8118).

(2) The electrophotographic transfer paper according to Clause (1), in which the density (JIS P-8118) falls within the range of from 0.95 to 1.20 g/cm$^3$.

(3) The electrophotographic transfer paper according to Clause (1) or (2), in which the water content of the paper which has just been unpacked falls within the range of from 4 to 6.5%.

DETAILED DESCRIPTION OF THE PRESENT INVENTION

The inventors noted that a high smoothness and a high air permeability coated paper having a white paper gloss of not less than 55% which is subject to a poor running due to adhesivity by adsorbed water can be prevented from being misfed in a high humidity atmosphere by controlling excessive adsorbed water present between the papers, which enhances the adhesivity between the papers, to reduce the coefficient of static friction between the papers. The adhesivity between the coated papers in a high humidity atmosphere becomes more remarkable when the coated paper has a higher white paper gloss and a higher smoothness. In general, it can be proposed that the control over the excessive adsorbed water be attained by increasing the permeation of water into the interior of the coat. However, the inventors' experiment shows that if the permeability of the interior of the coat is enhanced simply by increasing void of the coat, the resulting coat exhibits a reduced strength that makes itself easily peelable by a heating roll during the fixing of the toner or by folding the printed paper or scratching the surface of the printed paper. This phenomenon causes a partial omission of image. Thus, the foregoing proposal cannot be put into practical use.

The inventors made further extensive studies. As a result, it was found that the firm adhesion between papers is partly due to the expansion of the coated paper itself. In other words, water is adsorbed by the surface of the coated paper under high humidity conditions. In this case, although papers come in close contact with each other, it is thought that water is only adsorbed by one of the two sheets of coated paper but doesn't affect the other. However, in addition to the foregoing adsorption of water, the penetration of moisture into the fiber portion of the substrate of the coated paper causes the fiber to expand. It is thought that water adsorbed by the surface of the coat on one coated paper facing another enhances the adhesion between papers due to the expansion of fiber. As a result, the two sheets of coated paper are stuck to each other, causing a rise in the coefficient of static friction therebetween. This phenomenon occurs first at the edge of the paper. A range effectd thereby then gradually widens.

As mentioned above, the firm adhesion in the high humidity atmosphere occurs only when both the two factors, i.e., sufficient amount of adsorbed water on the surface of the coated paper and expansion of the coated paper itself are present. Further, this phenomenon greatly depends on the balance of the two factors.

In this respect, the present invention employs the ratio of expansion to density of the coated paper as a factor for stabilizing the running properties in the high humidity atmosphere. As the expansion there is employed the value obtained after 5 minutes of exposure to an atmosphere of 28° C. and 85%RH taking into account the conditions closest to the actual working conditions of the coated paper.

A low density coated paper is more subject to the permeation of moisture from the surface and cross section of the coated paper into the fiber in the substrate than a high density coated paper. Therefore, the low density coated paper expands greatly and adsorbs water on the surface thereof in a relatively small amount. On the contrary, a high density coated paper slightly expands and adsorbs water on the surface thereof in a relatively great amount.

In this respect, the inventors made studies of the relationship between the ratio of expansion to density of coated paper and the running properties. As a result, it was found that only when the ratio of expansion to density is adjusted to a range of from 0.8 to 3.5, the two factors can be well balanced, making it possible to inhibit the adhesion between papers in a high humidity atmosphere and hence secure good running properties. When the ratio of expansion to density falls below 0.8, the resulting coated paper exhibits too high a density and adsorbs water in too great an amount, thereby causing papers to firmly adhere to each other even when the coated paper slightly expands. On the contrary, when the ratio of expansion to density exceeds 3.5, the resulting coated paper adsorbs water in a small amount but expands too greatly, causing papers to firmly adhere to each other.

Furthermore, when the density of the coated paper exceeds 1.20 g/cm$^3$, the coefficient of static friction between coated papers is increased, thereby making the coated papers firmly adherable to each other. This is because a coated paper having such a density is normally supercalendered to secure a high glossiness and a high smoothness. As a result, the coated paper has a high density itself that inhibits the migration of water adsorbed on the surface thereof to the interior thereof and increases the amount of water remaining on the surface thereof. It was thus found that even if the expansion of the coated paper itself is minimized, only the small expansion causes the papers to be firmly adhered to each other. On the contrary, if the density of the coated paper falls below 0.95 g/cm$^3$, it is made actually impossible to adjust the white paper gloss to not less than 55%.

It is preferable that the water content in the coated paper which has just been unpacked is adjusted to a range of from 4 to 6.5%. If the water content falls below 4%, the difference in equilibrium moisture causes a chain wrinkle in the high humidity atmosphere. On the contrary, if the water content exceeds 6.5%, a blocking can occur during coating, a dusting can occur during the calendering, and a curling can occur after duplicating. These troubles cannot be inhibited.

A pulp to be used as the substrate of the coated paper in the present invention is not specifically limited. In practice, however, the pulp to be used as the substrate of ordinary coated paper may be used. For example, a sulfite pulp, kraft paper, semichemical pulp, chemically ground pulp, groundwood pulp, refiner ground pulp, and thermomechanical pulp may be used singly or in combination.

The substrate of the paper in the present invention may comprise a filler incorporated therein to improve its coatability and adjust its opacity and whiteness after coated. Examples of the filler to be incorporated in the substrate include inorganic fillers such as ground calcium carbonate, precipitated calcium carbonate, kaolin, calcined clay, pyrophyllite, silicate such as sericite and talc and titanium dioxide, and organic pigments such as urea resin and styrene resin. However, the present invention is not limited to these compounds. The amount of such a filler to be incorporated in the substrate is not specifically limited but is preferably from 3 to 20% by weight, more preferably from 5 to 15% by weight.

Various chemicals such as sizing agent to be incorporated in the substrate of the present invention may be internally or externally added. Examples of the sizing agent to be incorporated in the substrate include rosin-based sizing agent, synthetic sizing agent, petroleum resin-based sizing agent, and neutral sizing agent. Such a sizing agent may be used in combination with a proper fiber and fixing agent such as sulfuric acid band and cationic starch. Taking into account the preferability of duplicated paper in electrophotographic duplicating machines and printers, a neutral sizing agent such as alkenyl succinic anhydride-based sizing agent, alkyl ketene dimer, alkenyl succinic anhydride, neutral rosin, petroleum sizing agent, olefinic resin and styrene-acryl resin.

The coated paper of the present invention may comprise inorganic materials such as sodium chloride, potassium chloride, calcium chloride, sodium sulfate, zinc oxide, titanium dioxide, tin oxide, aluminum oxide and magnesium oxide or organic materials such as alkylphosphoric acid ester, alkylsulfuric acid ester, sodium sulfonate and quaternary ammonium salt incorporated therein singly or in admixture to adjust the surface electrical resistivity thereof. Besides these additives, the coated paper of the present invention may comprise various auxiliaries for ordinary coated paper substrate such as paper intensifier, dye and pH adjustor incorporated therein in a proper amount.

As the pigment to be incorporated in the coat for the coated paper of the present invention there may be used one for ordinary coated paper. For example, mineral pigments such as ground calcium carbonate, precipitated calcium carbonate, titanium dioxide, aluminum hydroxide, satin white, talc, calcium sulfate, barium sulfate, zinc oxide, magnesium oxide, magnesium carbonate, amorphous silica, colloidal silica, white carbon, kaolin, calcined kaolin, delaminated clay, alumino silicate, sericite, bentonite and smectite, particulate polystyrene resin, particulate urea formaldehyde resin, finely divided hollow particles, and other organic pigments may be used singly or in combination.

As the adhesive to be incorporated in the coated paper of the present invention there may be used any known adhesive. Examples of these adhesives include synthetic adhesives such as various copolymers (e.g., styrene-butadiene copolymer, styrene-acryl copolymer, ethylene-vinyl acetate copolymer, butadiene-methyl methacrylate copolymer, vinyl acetate-butyl acrylate copolymer), polyvinyl alcohol, maleic anhydride copolymer and acrylic acid-methyl methacrylate copolymer and natural adhesives such as oxidized starch, esterified starch, enzymatically-modified starch, cold water-soluble starch obtained by fresh-drying these starches, casein and soybean protein.

The foregoing adhesive may be used in an amount of preferably from 5 to 50 parts by weight based on 100 parts by weight of the pigment used. And it is more preferably from 10 to 30 parts by weight. If necessary, various auxiliaries to be incorporated in pigments for ordinary coated paper such as dispersant, thickening agent, water retainer, anti-foaming agent and waterproofing agent may be used in a proper amount.

The coating composition thus prepared is then applied to the substrate at once in a single layer or by portion in several layers in a dry amount of from 8 to 50 g/m$^2$ for each side on an off-machine processing or on an on-machine proceccing using a coating apparatus for use in the production of ordinary coated paper such as blade coater, air knife coater, roll coater, reverse roll coater, bar coater, curtain coater, die coater and gravure coater.

The smoothing of the paper thus coated is accomplished by means of a general-purpose smoothing apparatus such as supercalender, machine calender and soft nip calender. The coated paper is finished in such a manner that the resulting product exhibits a white paper glossiness of not less than 55% (JIS P8142) and a density of from 0.95 to 1.20 g/cm$^3$, preferably from 1.00 to 1.15 g/cm$^3$.

Further, the coated paper is treated at drying step and calendering step in paper-making machine and coater in such a manner that the resulting product exhibits a water content of from 4 to 6.5%, preferably from 4.5 to 6.0%, shortly after unpacked. Moreover, the coated paper product is preferably packed with a moisture proof packing paper such as polyethylene laminate or a polypropylene film to inhibit dehumidification thereof during storage.

EXAMPLES

The present invention will be further described in the following examples, but the present invention should not be construed as being limited thereto.

Example 1

100 parts by weight of a pigment component for coating composition, 20 parts by weight of precipitated calcium carbonate (TP-222H, produced by Okutama Kogyo K.K.), 80 parts by weight of kaolin (Ultrawhite 90, produced by Engelhard Corp.), 6 parts by weight of anoxidized starch (Oji AceB, Oji Corn Starch Co., Ltd.) and 9 parts by weight of a synthetic adhesive (JSR0668, produced by Japan Synthetic Rubber Co., Ltd.) as adhesive, and 0.3 parts by weight of a dispersant (Alon T-40, produced by TOA GOSEI CHEMICAL INDUSTRY CO., LTD.) were blended to prepare a coating composition. The coating composition thus prepared was then applied to both sides of a commercial substrate having a weight of 81.0 g/m$^3$ and a density of 0.73 g/cm$^3$ in an amount of 15 g/m$^2$ for each side by means of a bar coater. The coated material was then smoothed by means of a supercalender in such a manner that it exhibited a white paper glossiness (JIS P-8142) of about 60% and a paper water content (JIS P-8127) of 5%.

Example 2

100 parts by weight of a pigment component for coating composition, 100 parts by weight of precipitated calcium carbonate (TP-222H, produced by Okutama Kogyo K.K.), 10 parts by weight of an oxidized starch (OjiAceB, Oji Corn StarchCo., Ltd.) and 3 parts by weight of a synthetic adhesive (JSR0668, produced by Japan Synthetic Rubber Co., Ltd.) as adhesive, and 0.3 parts by weight of a dispersant (Alon T-40, produced by TOA GOSEI CHEMICAL INDUSTRY CO., LTD.) were blended to prepare a first coating composition. The coating composition thus prepared was then applied to both sides of a commercial substrate having a weight of 81.0 g/m$^3$ and a density of 0.73 g/cm$^3$ in an amount of 5 g/m$^2$ for each side by means of a bar coater. 100 parts by weight of a pigment component for coating composition, 20 parts by weight of precipitated calcium carbonate (TP-222H, produced by Okutama Kogyo K.K.), 80 parts by weight of kaolin (Ultrawhite 90, produced by Engelhard Corp.), 6 parts by weight of an oxidized starch (Oji Ace B, Oji Corn Starch Co., Ltd.) and 9 parts by weight of a synthetic adhesive (JSR0668, produced by Japan Synthetic Rubber Co., Ltd.) as adhesives, and 0.3 parts by weight of a dispersant (Alon T-40, produced by TOA GOSEI CHEMICAL INDUSTRY CO., LTD.) were blended to prepare a second coating composition. The second coating composition thus prepared was then applied to both sides of the foregoing coated paper in an amount of 10 g/m$^2$ for each side by means of a bar coater. The coated material was then smoothed by means of a supercalender in such a manner that it exhibited a white paper gloss (JIS P-8142) of about 60% and a paper water content (JIS P-8127) of 5%.

Example 3

An electrophotographic transfer paper was prepared in the same manner as in Example 1 except that the substrate was changed to a commercial substrate having a weight of 127.9 g/m$^3$ and a density of 0.71 g/cm$^3$.

Example 4

An electrophotographic transfer paper was prepared in the same manner as in Example 3 except that the white paper gloss (JIS P-8142) of the coated paper thus supercalendered was changed to about 65%.

Example 5

An electrophotographic transfer paper was prepared in the same manner as in Example 1 except that the substrate used was previously calendered to have a density of 0.82 g/cm$^3$.

Example 6

An electrophotographic transfer paper was prepared in the same manner as in Example 1 except that a coating composition prepared by blending 100 parts by weight of a pigment component for coating composition, 40 parts by weight of precipitated calcium carbonate (TP-222H, produced by Okutama Kogyo K.K.), 60 parts by weight of kaolin (Ultrawhite 90, produced by Engelhard Corp.), 6 parts by weight of an oxidized starch (Oji Ace B, Oji Corn Starch Co., Ltd.) and 9 parts by weight of a synthetic adhesive (JSR0668, produced by Japan Synthetic Rubber Co., Ltd.) as adhesives, and 0.3 parts by weight of a dispersant (Alon T-40, produced by TOA GOSEI CHEMICAL INDUSTRY CO., LTD.) was used.

Comparative Example 1

An electrophotographic transfer paper was prepared in the same manner as in Example 1 except that the coated paper was supercalendered to have a white paper glossiness (JIS P-8142) of about 70%.

Comparative Example 2

An electrophotographic transfer paper was prepared in the same manner as in Example 3 except that the coated paper was supercalendered to have a white paper gloss (JIS P-8142) of about 75%.

Comparative Example 3

An electrophotographic transfer paper was prepared in the same manner as in Example 5 except that the coated paper was supercalendered to have a white paper gloss (JIS P-8142) of about 70%.

Comparative Example 4

As an electrophotographic transfer paper there was used a commercial printing coated paper (OK Special Art, produced by Oji Paper Co., Ltd.) as it was.

Comparative Example 5

As an electrophotographic transfer paper there was used a commercial printing coated paper (OK Top Coat, produced by Oji Paper Co., Ltd.) as it was.

Comparative Example 6

As an electrophotographic transfer paper there was used a commercial printing coated paper (NK High Coat, produced by Nippon Kakoh Seishi Co., Ltd.) as it was.

Evaluation of Quality

The electrophotographic transfer papers of Examples 1 to 6 and Comparative Examples 1 to 6 were then measured for weight, density, white paper glossiness, expansion and paper water content by the following methods and subjected to the following running trouble test and evaluation of surging. The results are set forth in Tables 1 and 2.

The measurement of the weight of the electrophotographic transfer paper was effected in accordance with JIS P-8124.

The measurement of the density of the electrophotographic transfer paper was effected in accordance with JIS P-8118.

The white paper glossiness of the electrophotographic transfer paper was measured at an angle of 75° in accordance with JIS P-8142.

For the measurement of expansion, the electrophotographic transfer paper was allowed to stand in an atmosphere of 28° C. and 85%RH. The difference in the thickness (determined in accordance with JIS P-8118) of electrophotographic transfer paper between before and after exposure was then determined.

The paper water content shortly after unpacked was measured in accordance with JIS P-8127.

For the evaluation of the running properties of the electrophotographic transfer paper, a Type Docucolor 4040 dry type indirect electrophotographic duplicating process digital color duplicating machine produced by Fuji Xerox Co., Ltd. was used. The evaluation was effected in an atmosphere of 28° C. and 85%RH. In some detail, the sample to be fed was placed on the manual tray of the duplicating machine shortly after unpacked. 1,000 sheets of electrophotographic transfer papers were then allowed to run. The total number of misfed papers, jamming papers and multi-fed papers was counted as number of defective runs.

For the evaluation of chain wrinkle, the sample was allowed to stand in an atmosphere of 28° C. and 85%RH for 5 minutes shortly after unpacked. The evaluation of surging was effected in accordance with the following 4-step criterion:

A: No chain wrinkle observed;

B: Some chain wrinkle observed;

C: Some but acceptable chain wrinkle observed; and

D: Chain wrinkle is so remarkable as to impede running

TABLE 1

| Example No. | 1 | 2 | 3 | 4 | 5 | 6 |
|---|---|---|---|---|---|---|
| Weight (g/m$^2$) | 111 | 112 | 158 | 158 | 110 | 111 |
| Density D (g/cm$^3$) | 1.16 | 1.10 | 1.08 | 1.15 | 1.12 | 1.18 |
| White paper gloss (%) | 59 | 60 | 60 | 65 | 61 | 60 |
| Expansion CA ($\mu$m) | 1.8 | 1.2 | 2.8 | 1.9 | 1.3 | 1.1 |
| CA/D | 1.6 | 1.1 | 2.6 | 1.7 | 1.2 | 0.9 |
| Paper water content (%) | 5.0 | 4.9 | 5.1 | 5.1 | 5.0 | 5.0 |
| Number of defective runs | 1 | 0 | 0 | 1 | 1 | 2 |
| Evaluation of chain wrinkle | A | A | A | A | B | A |

TABLE 2

| Comparative Example No. | 1 | 2 | 3 | 4 | 5 | 6 |
|---|---|---|---|---|---|---|
| Weight (g/m$^2$) | 111 | 158 | 110 | 84 | 126 | 188 |
| Density D (g/cm$^3$) | 1.26 | 1.23 | 1.22 | 1.20 | 1.22 | 1.18 |
| White paper gloss (%) | 70 | 75 | 70 | 68 | 71 | 64 |
| Expansion CA ($\mu$m) | 0.6 | 0.8 | 0.4 | 0.3 | 0.3 | 4.1 |
| CA/D | 0.5 | 0.7 | 0.3 | 0.3 | 0.2 | 3.6 |
| Paper water content (%) | 5.0 | 5.1 | 5.0 | 4.5 | 4.9 | 4.3 |
| Number of defective runs | 55 | 49 | 45 | 89 | 103 | 94 |
| Evaluation of chain wrinkle | A | A | B | C | A | A |

As can be seen in Tables 1 and 2, the transfer papers of Examples 1 to 6 showed little or no defective runs in a high humidity atmosphere and hence good running properties, though having a white paper glossiness of not less than 55%. On the contrary, it can be seen that the transfer papers of Comparative Examples 1 to 3 exhibited an expansion-to-density ratio as small as from 0.3 to 0.7 and hence showed remarkable defective runs in a high humidity atmosphere. Thus, the transfer papers of Comparative Examples 1 to 3 showed deteriorated running properties. The transfer papers of Comparative Examples 4 and 5, which are commercial coated papers, showed too small an expansion-to-density ratio and hence much defective runs. Moreover, the transfer paper of Comparative Example 6, which is a commercial coated paper, showed too great an expansion-to-density ratio and hence much defective runs.

In accordance with the present invention, the use of the foregoing constitutions makes it possible to provide an electrophotographic transfer paper which exhibits excellent running properties in spite of its high white paper glossiness. This makes a great contribution to the enhancement of the operation speed of duplicating machines, printers, etc. and the improvement of image quality.

What is claimed is:

1. An electrophotographic transfer paper comprising:

a substrate; and coating layers formed on both sides of said substrate mainly including a pigment and an adhesive, wherein said paper has a glossiness of not less than 55% and satisfies the following condition when said paper packed in a package is unpacked and allowed to stand at a temperature of 28° C. in an atmosphere of 85%RH for 5 minutes:

$$0.8 \leqq CA/D \leqq 3.5$$

wherein

CA ($\mu$m) is the difference calculated by substracting a thickness of paper before allowed to stand from a thickness of paper after allowed to stand;

D (g/cm$^3$) is the density of said transfer paper;

wherein the density of said paper falls within the range of from 0.95 to 1.20 g/cm$^3$; and wherein each of the coating layers on both sides of the substrate is present in an amount of from 15 to about 50 g/m$^2$.

2. The electrophotographic transfer paper as claimed in claim 1, wherein the water content of said paper immediately after unpacked falls within the range of from 4 to 6.5%.

3. The electrophotographic transfer paper as claimed in claim 1, wherein the coating layers contain the adhesive in an amount of from 5 to 50 parts by weight based on 100 parts by weight of the pigment.

4. The electrophotographic transfer paper as claimed in claim 3, wherein said coating layers contain the adhesive in an amount of from 10 to 30 parts by weight based on 100 parts by weight of the pigment.

5. The electrophotographic transfer paper as claimed in claim 1, wherein the density of said paper falls within the range of from 1.00 to 1.15 g/cm$^3$.

6. The electrophotographic transfer paper as claimed in claim 2, wherein the water content of said paper immediately after unpacked falls within the range of from 4.5 to 6.0%.

* * * * *